Figure 1:
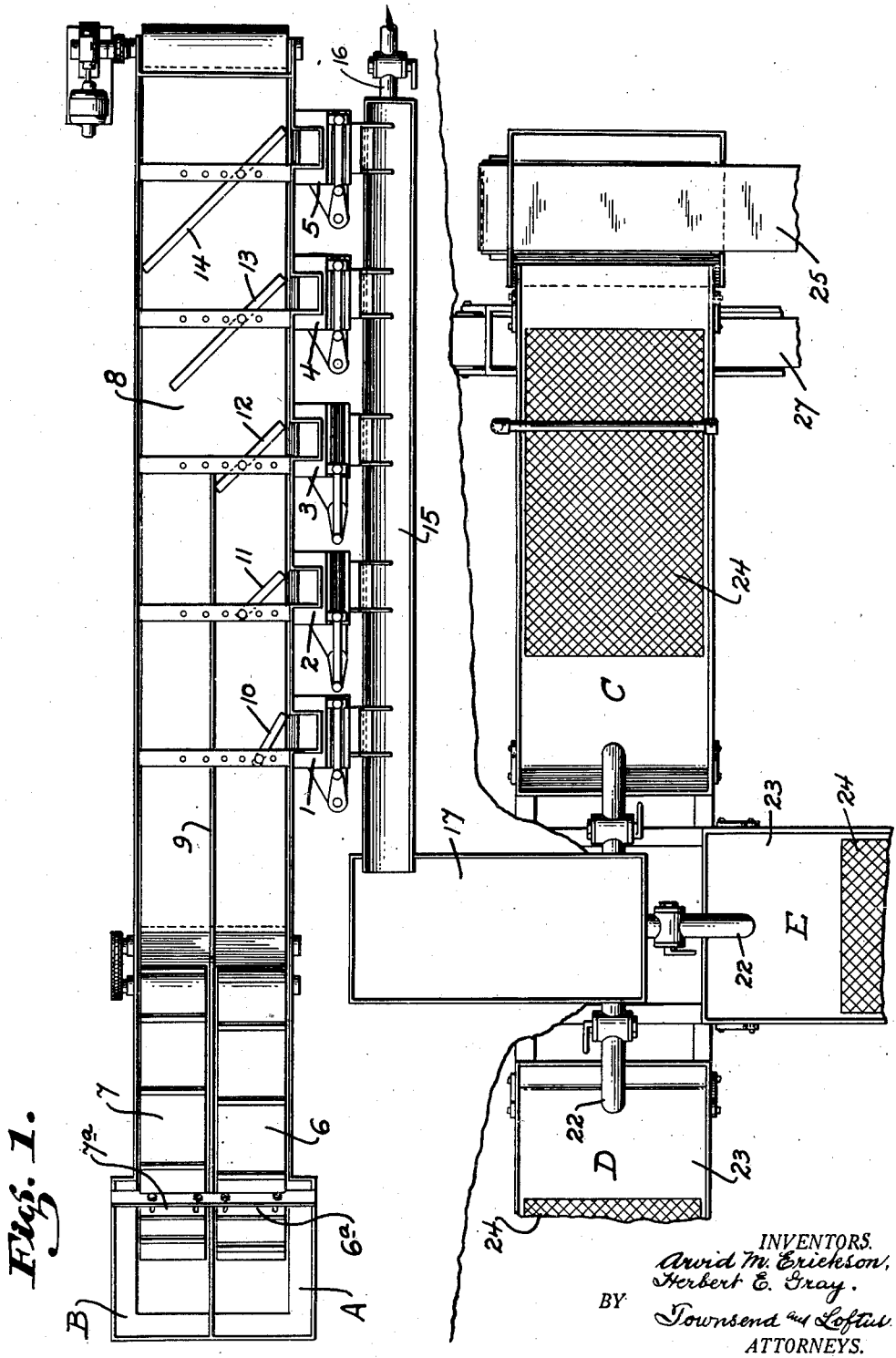

June 9, 1936.  A. M. ERICKSON ET AL  2,043,739
METHOD AND APPARATUS FOR PROPORTIONING AND MIXING FRUIT
Original Filed Dec. 2, 1933   2 Sheets-Sheet 1

INVENTORS.
Arvid M. Erickson,
Herbert E. Gray.
BY Townsend and Loftus
ATTORNEYS.

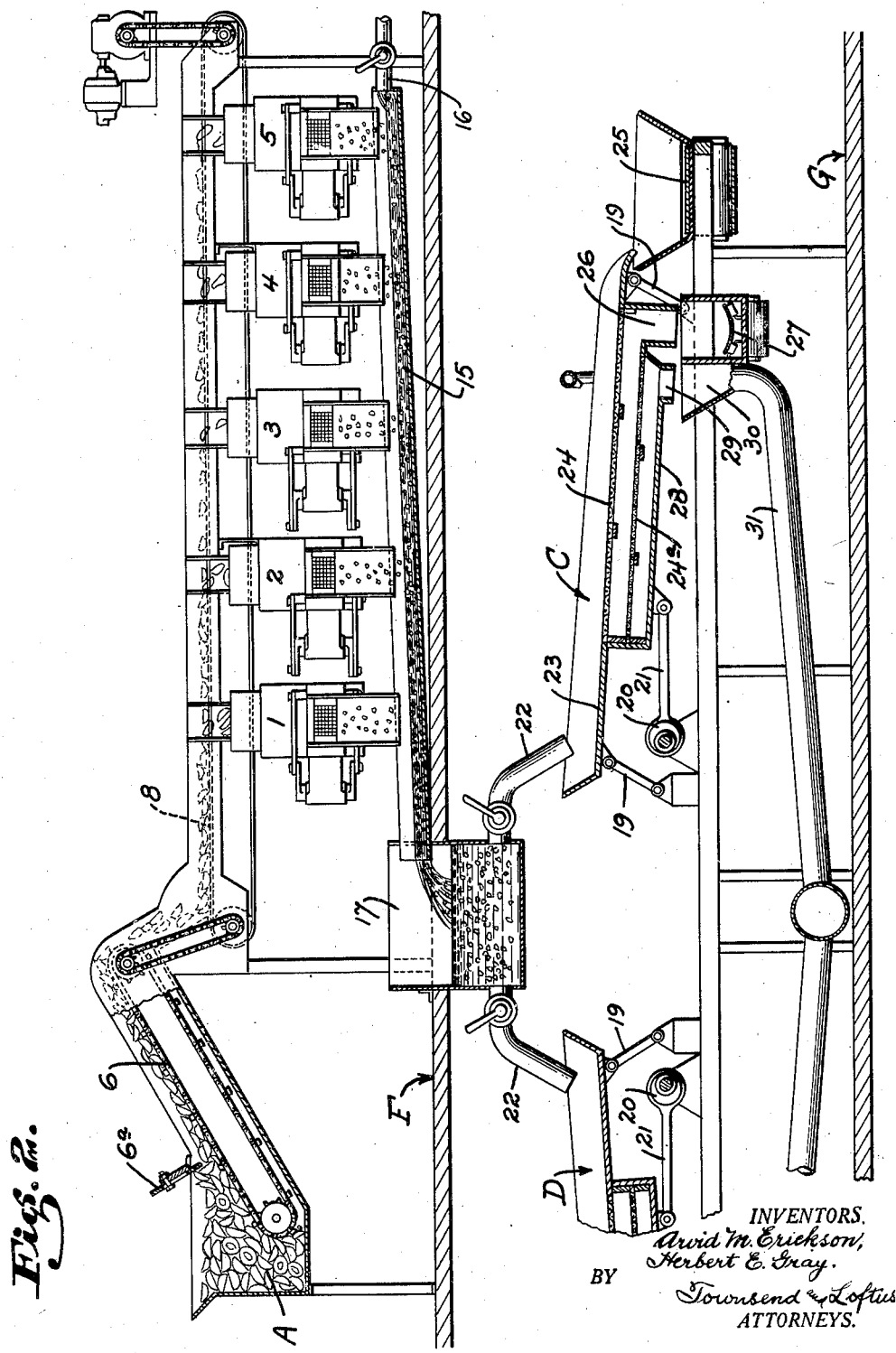

Patented June 9, 1936

2,043,739

UNITED STATES PATENT OFFICE 2,043,739

METHOD AND APPARATUS FOR PROPORTIONING AND MIXING FRUIT

Arvid M. Erickson and Herbert E. Gray, San Jose, Calif., assignors to Barron-Gray Packing Company, San Jose, Calif., a corporation of California Application December 2, 1933, Serial No. 700,662
Renewed October 9, 1934

19 Claims.  (Cl. 99—100)

This invention relates to the art of canning fruit, vegetables and the like particularly to a method and apparatus for proportioning and mixing diced fruits or vegetables preparatory to canning or other preserving operations.

The present application is a continuation in part of our prior application entitled Fruit proportioning and blending device Serial No. 550,884, filed July 15, 1931.

One of the objects of the present invention is to provide an apparatus and also a process for preparing a mixture of diced fruits and/or vegetables and particularly for preparing a homogeneous mixture of diced different fruits for fruit cocktails wherein each such mixture is standardized as to its proportion of different fruit ingredients for any particular pack.

Another object of the invention is to provide a method and apparatus for producing a mixture of either fruit or vegetable diced ingredients which is standardized as to the proportion of different fruit or vegetable ingredients and wherein the proportion of different ingredients of any such standardized mixture may be readily changed for different packs.

Another object of the present invention is to provide a process and apparatus particularly adaptable for the production of fruit cocktails and especially for the production of fruit cocktails containing a homogeneous mixture of diced peaches and pears standardized as to proportion of the different fruit ingredients.

Another object resides in a process and apparatus for continuously converting half peaches or sections and half pears or sections into a homogeneous mixture of diced peaches and pears which includes the continuous feeding of both the peaches and pears indiscriminately arranged to means which automatically and uninterruptedly dices the peaches and pears and conveys them, and mixes them and removes the small slivers, in continuous fashion to a desired processing station.

And another object of the present invention is to provide a method and apparatus for proportioning and mixing fruits and/or vegetables and the like in such a manner that predetermined proportions of different varieties are assured, continuous operation provided, symmetrical and/or uniform shape and size of the pieces of different fruit and/or vegetables maintained during the process, the fruit thoroughly washed and/or mixed, small particles and shreds removed, and the handling and bruising of the fruit entirely eliminated.

In the processing and packaging of mixtures of diced fruit and mixtures of diced vegetables, especially mixtures of diced fruits for fruit cocktails, it is of considerable importance that the fruits and/or vegetables be cut into more or less symmetrically shaped pieces of substantially uniform size and shape such as cubes, and that certain of the ingredients be so shaped and sized whereby in the ultimate mixture there is a uniformity and symmetry of such shapes and dices to produce a pleasing and merchantable effect. In addition, in standardized packs or mixtures, it is important that a predetermined proportion of such ingredients be maintained during the forming and mixing of the separate ingredients so as to produce a maximum merchantability of the pack as well as for reasons of economy in manufacture and also to meet the demands of the trade. For instance, one purchaser desires the mixture to run a heavier percentage of pears than peaches and vice versa. At other times the price of a particular ingredient is so high as to require a smaller percentage thereof in the ultimate mixture.

In the processing of diced fruits composed of more than one kind of fruit and particularly in the preparation of what is known as fruit cocktails composed of a plurality of diced fruits homogeneously mixed in standardized definite proportions of each separate ingredient, and particularly in the preparation of a diced, homogeneous, standardized, mixture of peaches and pears and like delicate, perishable fruits and/or vegetables, it is of the utmost importance that not only the actual dicing operation of the separate kinds of fruit be carried on simultaneously and continuously, but it is of further importance that these diced fruits be mixed together in a homogeneous, standardized fashion continuously and uninterruptedly; that the diced fruits also be subjected to a continuous operation wherein small slivers of small pieces are removed and the mixed fruits are passed in a continuous manner to the filling and canning stations thereby eliminating all delay in the processing of the fruits from the dicing operation to the filling and canning operations and thereby eliminating to the minimum the discoloration or sloughing of the fruit shapes which markedly impairs the merchantability and value of the ultimate product. Particularly in the dicing of pears and peaches it is noticed that pears, because of their delicate texture, will quickly slough, discolor and deteriorate particularly when in mass form as when subjected to the weight of superimposed pears or pieces of pears. In the preparation of diced mixed fruits of various kinds it is important that the various fruits so diced shall be mixed homogeneously in the ultimate product, and it is also an important demand of the trade, in most instances, that the diced fruits be standardized as to the proportions of each diced ingredient, and further that a simple process or means be provided for quickly and easily changing the standardization of any particular pack so that the proportion of an individual ingredient in the mixed pack may be altered as desired. It is of maximum importance that after the fruits have been diced, and prior to their arrival at the canning station they not be subjected to any injurious mixing operation which, as has been discovered, tends to injure, not only the texture of the relatively small diced shapes of perishable fruit, but also tends to alter the symmetry, alter the desired uniform shape, and cause discoloration and sloughing of the diced cubes, or other preselected shapes. In short, it is important that no operation be performed in the entire dicing process which will tend to prevent the production of a standardized, homogeneous mixture of various fruits of perishable nature in preselected symmetrical uniform shapes of predetermined size.

In certain instances it is deemed desirable and preferable, in the processing of diced fruits and vegetables in large volume and of different kinds, and particularly in the preparation of a diced mixture of peaches and pears, especially when the pears are properly ripened and when the peaches are of the cling type, that the dicing operation be carried out so that the peaches and pears are diced separately in separate, continuously flowing streams of fruit and in a manner such that during their continuous passage from the separate dicing machines they are homogeneously admixed in standardized preselected proportions without any interruption in the process and without the intervention of any injurious mechanical mixing operation.

In general, therefore, this invention embraces a process and apparatus for producing a homogeneous mixture of various kinds of perishable fruits such as peaches and pears which is carried out in such a continuous, expeditious manner as to practically preclude the discoloration and sloughing off of the fruit after dicing; which will produce and maintain a preselected uniform symmetry, size, shape and generally natural color of the different kinds of fruit and which will homogeneously mix them in preselected standardized proportion and convey them immediately without interruption to the canning or subsequent preserving operations.

In the treatment of materials such as ripe, soft fruits, such as pears, and some relatively soft vegetables, to produce diced or symmetrical shapes, it is preferable that the processing be carried out so that those ingredients of the ultimate mixture which are relatively harder or more firm than the softer ingredients of the mixture, shall not in any way injure the relatively softer ingredients and thus detract from the pleasing appearance and saleability of the ultimate mixture.

In order to achieve the foregoing objects and results the invention contemplates preferably the utilization of two or more dicing machines each adapted to cut or otherwise form a single, different kind of fruit or vegetable into desired smaller shapes and sizes of pieces such as cubes, and other preselected symmetrical shapes, and where by the use of a separate machine for each kind, the harder fruit being diced will not injure the softer fruit being diced; the invention also includes means for feeding different kinds of fruit and/or vegetables to the respective dicing machines and means for regulating the quantity of each material so fed to each machine, and in addition includes the homogeneous mixing of the product or discharge from each dicing machine in such a manner that the ultimate or final mixture will include or be made up of a predetermined proportion of each ingredient. The invention comprehends an arrangement or means whereby the quantity or volume of each proportionate ingredient with respect to the whole mixture, may be instantly changed as desired whereby to provide packs containing different proportions of standardized preselected proportions of symmetrically shaped and sized different ingredients of fruits and/or vegetables.

The invention includes in one of its specific embodiments the utilization of a fluid medium for the conveying and mixing and/or preserving the size and shape of the diced fruit or vegetables discharged from the respective dicing machines, whereby to provide a more efficient intermixing, a better quality and appearance of shape and size of each ingredient of the mixture. In addition, it includes means for separating the smaller, less desirable pieces and shreds from the diced fruit, the draining of the fluid medium from the diced fruit and the delivery of the diced mixed fruit to can-filling machines and the like preparatory to cooking, sterilization, and subsequent operations.

The invention includes these and other objects which will be apparent from a perusal of the following application when taken in connection with the accompanying drawings, wherein:

Figure 1 is a plan view of one form of apparatus for carrying out the process of the invention; and Figure 2 is a side elevation of the machine shown partially in section.

Referring now to the drawings in detail and particularly to Figures 1 and 2, there is shown in the preferred form of invention one type of apparatus or means for feeding or conveying from separate sources of supply, different kinds of fruits and/or vegetables. In the present instance there is provided a pair of hoppers A and B, preferably placed side by side for convenience, into which the material to be cubed is delivered. In the present instance, diced fruit has been selected for purposes of illustration, and we have selected for the purpose of exemplification of the process and apparatus, fruit to be diced for the preparation of a standardized homogeneous fruit cocktail mixture consisting in the present instance of diced peaches and diced pears. In this instance, it is assumed that the peaches and pears are to be cut into cubes and homogeneously mixed and that the proportion desired is ⅗ of peaches and ⅖ of pears. Obviously any desired admixture of ingredients or any ingredients may be obtained, as will hereinafter be more fully explained.

The peaches and pears are first peeled, halved, cored or pitted as the case may be, and the fruit halves or sections thus prepared are delivered to the respective hoppers A and B in any suitable manner. From the hoppers the fruit is conveyed, preferably in indiscriminate order, by means adapted to control the amount of volume or proportion of each ingredient; to wit, in the present instances, peaches and pears. The separate conveyors are arranged to feed into dicing machines generally indicated at 1, 2, 3, 4 and 5. The conveying means preferably employed is a pair of conveyor belts 6 and 7 which deliver the peaches and pears to a common conveyor 8, there being a longitudinally extending center guide 9 separating the peaches and pears while traveling on the conveyor 8, deflectors 10, 11, 12, 13 and 14 directing the fruit into the respective dicing machines. The quantity or amount of fruit delivered by these belts 6 and 7 to the common conveyor 8 is important in one aspect of the invention, since the proportion of one fruit with relation to the other must be maintained if a predetermined, definite standardized mixture of fruit is to be obtained. Our preferred construction for insuring a definite proportion of ingredients may comprise a pair of vertical adjustable gates 6A and 7A. These gates may regulate the quantity of fruit removed by each belt 6 and 7 from the respective hoppers, and, as such, adjustably control the volume, proportion or rate of feed of each fruit delivered to the common conveyor and to such dicing means fed thereby. It is obvious that any desired means of feeding or conveying the different kinds of fruit to the dicing machines may be utilized and that any desired arrangement or means may be provided for adjustably determining the amount or volume of each separate kind of fruit which is fed to its particular dicing machine; it being understood, that a particular feeding setting when once made will be maintained for the continuous running of a particular pack.

Each of the dicing machines is of a construction for the continuous or practically continuous production of diced fruit or vegetables. By dicing is meant the cutting or sub-dividing of fruit as it is fed to the machine in the form, for instance of half peaches or half pears, whereby a plurality of cubes or desired smaller symmetrical and uniform shapes is produced. It is understood, of course, that when a half peach or a half pear is fed to the dicing machine, due to the roundness or semi-roundness of certain portions of the peach, pear or other fruit or vegetable so fed, certain small proportion of the cuttings from the dicing machine will not be entirely symmetrical and will not be uniform in shape with the greater proportion of cuttings or dicings coming from the machine. In particular, certain small pieces or slivers will be formed but these will be a relatively small part of the output of any particular dicing machine. In short, each machine in general produces a relatively large proportion of cubes, or other diced symmetrical shapes, which are of uniform size and appearance. While any desired type of dicing machine may be utilized for producing the shapes and sizes hereinbefore set forth, we have disclosed dicing machines having hoppers for receiving the half peaches and half pears in indiscriminate order from the conveyors, which construction makes for a speedy and continuous process. In addition, the dicing machines are disclosed as provided with square shaped cutting dies for providing diced cubes of preferably uniform size and shape. Each machine is arranged to cut or dice the fruit so received without interruption, and to discharge the same in a substantially continuous, uninterrupted manner. It will be noted that our process and apparatus preferably provide means whereby separate dicing machines or units are used for dicing the matured peaches and properly ripened pears. This is desirable from one aspect of our invention due to the difference in solidity or firmness of clingstone or yellow cling peaches and pears and similar fruits and/or vegetables. It is desirable and preferable that one dicing machine dice only pears and a separate dicing machine dice only peaches. We have found that if both peaches and pears are fed to the same dicing machine the cling peaches, which are generally considerably firmer than the ripe pears, will tend to squash and deform ripe pears during the dicing operation thereby producing a large amount or percentage of what is known as "slush", which considerably detracts not only from the output but also from the appearance of the diced product from the machine.

As hereinbefore stated one of the important objects of our invention is to provide a homogeneous mixture of the different ingredients of the pack and to maintain during the mixing, the same proportion of each constituent in the mixture which each machine contributes to the whole mixture, whereby the standardized mixture is maintained in a continuous manner; whereby the homogeneous or thoroughness of the mixing of each contributing ingredient in the mixture is assured and also, which is very important, whereby the shape and appearance of the diced fruit so mixed is preserved.

In carrying out this feature of the invention, we provide means whereby the separately discharged diced fruit from each machine is thoroughly or homogeneously intermixed. This may be accomplished by any type of conveying means. In the illustrated embodiment, we desire to arrange the discharge of each dicing machine so that it discharges or spreads its diced fruit directly onto a conveying means which either by itself or in conjunction with other devices mixes and conveys the mixed diced fruits to other stations where subsequent operations are carried out or performed on the diced fruit. A simple manner of insuring or permitting the admixture of the various ingredients of the diced fruit comprises a conveyor arranged to receive the separate discharge of each dicing machine whereby the discharge from one dicing machine traveling along on the conveyor will travel directly under the discharge of a second, third, fourth or fifth dicing machine so that each machine will dump or scatter its contributing ingredients of the entire mixture into the discharge of the other machine or machines.

One of the specific features of the present invention resides in providing a conveying mechanism which will not only mix the diced fruit coming from the separate machines but will likewise function to wash and clean the diced fruit, prevent its direct oxidation by the air, handle the fruit without bruising or disturbing the preformed shape produced by the dicing machine and effect a maximum dispersion or distribution of the separate kinds of diced fruit one into the other for producing the homogeneous mixture.

With these more specific objects in view, means is provided for discharging the fruit from the several dicing machines by gravity through short chutes into an inclined trough indicated at 15. Connecting with one end of the trough is a valved pipe which supplies water or other fluid from any suitable source, such as by gravity, pump or the like, and whereby a continuous stream of water or fluid is maintained in the trough. This stream of water discharges from the opposite end of the trough preferably into an additional mixing and distributing tank 17. In the embodiment illustrated, the arrangement of this trough which conveys, mixes and washes the fruit, is such that it receives at its upper end the discharge from the dicing machines 4 and 5 which, in the present instance, discharge diced pears. The pears thus delivered at the upper end of the trough are carried rapidly immediately under the discharged end of the remaining dicing machines 1, 2 and 3 from which diced peaches are continuously being discharged. This dumping or depositing of the peaches on the pears, or the pears on the peaches if desired, due to the fact that the pears are more or less distributed and dispersed in the fluid in the trough, will cause the diced peaches when dumped into the water on top of the diced pears to spread in a more or less uniform manner as they are carried along by the current of water, so that by the time the diced peaches and pears reach the end of the trough they are in substantially homogeneously mixed condition. If desired, a further mixing can take place in the tank 17. Due to the fact that the stream of water from the trough 15 discharges preferably at right angles to the movement of water in the tank 17 during the passage of the diced fruit in and through the water, it is thoroughly washed. In addition, by reason of the cushioning effect of the water, the diced fruit when dumped thereinto is not bruised or crushed and its symmetrical shape is preserved and maintained. Also in view of the fact that the diced fruit is immediately immersed in water it is not subjected to the oxidizing effect of the air so that the freshness and appearance of the fruit is preserved.

After the fruit has been thus diced, washed, and homogeneously mixed it is desirable to remove the smaller particles of fruit and shreds, and also to drain the fruit of the water. This is accomplished by directing the wash water and fruit over a series of shaker tables generally indicated at C, D and E. Any type of shaker tables may be employed. They consist generally of a wooden frame or the like presenting a table-like surface pivotally supported on opposite ends by arm 19. An eccentric 20 is connected to the table by a rod or link 21, and when the eccentric is driven, a shaking movement is transmitted to the table. Fruit and water from the tank 17 is delivered to the table through a valve controlled pipe 22. The fruit and water is first deposited on a flat table surface 23 where the fruit is spread and it then passes over a coarse screen 24 through which the water, the smaller particles, and the shreds pass, proper sized pieces of diced fruit continuing over the screen and discharging on the conveyor 25 which carries the fruit to can filling machines, or the like, where the fruit is packed into the cans preparatory to cooking, and sterilizing.

The smaller particles of fruit, and shreds, are caught by a second screen indicated at 24a which is preferably placed below the top screen. These smaller particles discharge through a chute 26 onto a conveyor 27. The wash water drains through the screens 24 and 24a and is collected by bottom section 28 which is provided with a discharge spout 29 at one end delivering into a drain hopper 30 and a pipe 31. The water passing through the pipe 31 may be pumped back for re-use or may be filtered for re-use or may be otherwise disposed of.

By referring to Figure 2 it should be noted that the fruit receiving hoppers, the conveyor feeding belts, the dicing machines, and the trough 15 and tank 17 are located on a floor F and that the shaker tables are supported on a floor below and indicated at G. This arrangement, while not absolutely necessary, is nevertheless desirable as it permits gravity feed and flow of the fruit and water from the dicing machines to the final discharge conveyor 25, and to that extent eliminates any handling of the fruit. Thorough washing and mixing the fruit is at the same time insured without danger of bruising as the fruit is maintained in suspension, or in other words, in floating condition in the water during these operations. Continuous operation is promoted and any desired proportion of the fruit can be assured by proper adjustment of the gates 6a and 7a.

While certain features of the present invention are more or less specifically described, we wish it understood that various changes may be resorted to within the scope of the appended claims.

Having thus described our invention, what we claim and desire to secure by Letters Patent is—

1. A method of producing a fruit mixture which comprises feeding different kinds of fruit to a plurality of dicing machines, regulating the quantity of fruit fed to each machine to maintain a predetermined proportion of each kind of fruit, discharging the diced fruit from each dicing machine into a tank of water to wash and mix the diced fruit, removing the fruit from the wash water and then draining the fruit.

2. A method of producing a fruit mixture which comprises feeding different kinds of fruit to a plurality of dicing machines, regulating the quantity of fruit fed to each machine to maintain a predetermined proportion of each kind of fruit, discharging the diced fruit from each dicing machine into a flowing stream of water and at separated points along said stream of water so that one kind of fruit will be deposited on another, said stream of water insuring washing and further mixing of the diced fruit delivered thereto, and then draining the fruit.

3. A method of producing a fruit mixture which comprises feeding different kinds of fruit to a plurality of dicing machines, regulating the quantity of fruit fed to each machine to maintain a predetermined proportion of each kind of fruit, discharging the diced fruit from each dicing machine into a flowing stream of water to wash and mix the diced fruit, directing the stream of water, together with the diced fruit carried thereby, into a tank to further wash and mix the fruit, and then delivering the water and fruit to a shaking screen to drain off the water and at the same time remove the smaller particles of fruit.

4. An apparatus of the character described comprising a plurality of hoppers to receive different kinds of fruit, a plurality of fruit dicing machines, means for removing the different kinds of fruit from the hoppers and for delivering the fruit to the respective dicing machines, means for regulating the quantity of fruit delivered to each dicing machine to maintain predetermined portions of each kind of fruit, a trough disposed adjacent the respective dicing machines, means for maintaining a continuous flowing stream of water in said trough to receive, wash and mix the different kinds of fruit discharging from the dicing machines, and means for draining the fruit.

5. An apparatus of the character described comprising a plurality of hoppers to receive different kinds of fruit, a plurality of fruit dicing machines, means for removing the different kinds of fruit from the hoppers and for delivering the fruit to the respective dicing machines, means for regulating the quantity of fruit delivered to each dicing machine to maintain predetermined portions of each kind of fruit, a trough disposed adjacent the respective dicing machines, means for maintaining a continuous flowing stream of water in said trough to receive, wash and mix the different kinds of fruit discharging from the dicing machines, a tank into which the flowing stream of water carrying the diced fruit discharges and in which further mixing and washing of the fruit is obtained, a shaker screen, and means for directing the fruit and water from the tank over the surface of the screen to drain the fruit and to remove the smaller particles of fruit.

6. A method of producing a fruit mixture which comprises feeding different kinds of fruit to a plurality of dicing machines, regulating the quantity of fruit fed to each machine to maintain a predetermined proportion of each kind of fruit, removing the diced fruit discharging from each dicing machine and delivering the diced fruit into a tank of water to wash and mix the fruit, and then delivering the fruit to a screen to drain off the water and at the same time remove smaller particles of fruit.

7. An apparatus of the character described comprising a plurality of hoppers to receive different kinds of fruit, a plurality of fruit dicing machines, means for removing the different kinds of fruit from the hoppers and for delivering the fruit to the respective dicing machines, means for regulating the quantity of fruit delivered to each dicing machine to maintain predetermined proportions of each kind of fruit, means for removing the diced fruit discharging from each dicing machine and for delivering the diced fruit to a tank of water to wash and mix the fruit, and means for removing the fruit from the wash water and for draining the fruit.

8. An apparatus of the character described comprising means for continuously feeding a plurality of relatively large sections of different kinds of fruit, means for adjustably controlling the respective proportion of each kind of fruit sections continuously so fed, means for dicing the fruit as it is fed and means for homogeneously mixing the separate kinds of diced fruit.

9. An apparatus of the character described comprising means for continuously feeding a plurality of relatively large sections of different fruits, means for adjustably controlling the respective proportion of each kind of fruit sections so fed continuously, and means for dicing the fruit as it is fed and for continuously conveying the diced fruit in mixed condition from the dicing means.

10. A continuously operating automatic apparatus for producing a homogeneous, standardized mixture of a plurality of diced fruits, comprising means forming a plurality of separate sources of different fruits, each fruit thereof comprising a relatively large section, means for continuously feeding the different fruit sections, means adapted to receive the flow therefrom, automatically and uninterruptedly to dice the sections so fed and continuously and homogeneously to mix the different kinds of diced fruit.

11. An apparatus of the character described for producing a homogeneous, standardized mixture of a plurality of diced fruits comprising means forming a plurality of separate sources of different fruits wherein each fruit comprises a relatively large section, conveying means for each such source for continuously and simultaneously feeding the different fruit sections therefrom, dicing means adapted to be fed by each such conveying means, to receive the flow automatically and uninterruptedly therefrom and to dice the sections so fed, and means for continuously and homogeneously mixing the different kinds of diced fruit discharged from the dicing means.

12. In a dicing apparatus for fruits and vegetables, the combination of a plurality of dicing machines each adapted to dice material as it continually flows to such machine, means providing separate sources of relatively large sections of such different material to be diced, means for continuously feeding relatively large sections of material from one of such sources to one dicing machine at a predetermined rate to provide for the continuous conversion of such large sections of material from said source to diced condition, means for continuously feeding relatively large sections of another kind of such material from another of such sources to another dicing machine at a predetermined rate to provide for the continuous conversion of such large sections of such material to diced condition, means for varying the relative proportions of such fruit sections so fed, and means for continuously mixing the diced different materials.

13. An automatic apparatus for preparing a mixture for fruit cocktails standardized as to proportions of different fruit ingredients, comprising means for feeding peach sections continuously and at a predetermined rate of feed, dicing means adapted to dice said peach sections so fed, and without interruption to the flow to such dicing means, means for simultaneously feeding pear sections continuously and at a predetermined rate of feed, additional dicing means adapted to dice the pear sections so fed and without interruption to the flow to such additional dicing means, and means for continuously conveying the diced peaches and pears from the dicing means and for continuously mixing the diced peaches and pears during and without interrupting their conveyance.

14. An apparatus for the continuous conversion of half peaches and half pears into a standardized admixture of diced peaches and pears comprising means providing a source of indiscriminately arranged half peaches, means providing a source of indiscriminately arranged half pears, a dicing machine for the peaches, a dicing machine for the pears, means for conveying the peaches in such indiscriminately arranged condition to the first dicing machine, and means for conveying the pears in such indiscriminately arranged condition to the second dicing machine and for continuously conveying the diced peaches and pears from the dicing machines, and means for thoroughly mixing the diced peaches and pears while so conveyed.

15. The herein described continuous process of preparing diced fruits or vegetables comprising continuously feeding relatively large sections of one kind at a predetermined volume, dicing the sections without interrupting the continuous flow of such sections, simultaneously continuously feeding relatively large sections of another kind at a predetermined volume, dicing such sections without interrupting the continuous flow thereof and continuously and homogeneously mixing the dicings from the different sections substantially in proportion to their respective volumes of feeding.

16. The herein described process of preparing a diced mixture for fruit cocktails, standardized as to proportion of different fruit ingredients, comprising feeding peach sections continuously and at a predetermined rate of feed, dicing the peaches while fed at such rate, simultaneously feeding pear sections continuously and at a predetermined rate of feed, dicing the pears to similar shape and size while fed at such rate, and homogeneously mixing the diced peaches and pears.

17. The herein described continuous process of preparing a mixture for fruit cocktails, standardized as to proportion of different fruit ingredients, comprising, feeding peach sections continuously and at a predetermined rate of feed, dicing the peaches while so fed, into uniform shape and predetermined size, simultaneously feeding pear sections continuously and at a predetermined rate of feed, dicing the pears into uniform shape and size while so fed, continuously mixing the cut peaches and pears and continuously removing the very small cuts of peaches and pears.

18. The herein described process of converting half peaches and half pears into a diced mixture for fruit cocktails, standardized as to proportion of peach and pear ingredients, comprising continuously feeding the half peaches and half pears in separated relation and indiscriminately arranged, separately dicing the half peaches and half pears while so conveyed and without interrupting the flow thereof, conveying the diced peaches and pears and homogeneously mixing the same while so conveyed and without interrupting their flow.

19. The herein described continuous process of preparing diced fruits or vegetables comprising continuously feeding relatively large sections of different kinds of fruits or vegetables from separate sources of supply, to a discharge station for canning or the like, continuously controlling the volume of each kind of sections so fed and continuously and automatically converting the sections as they are fed, into diced sections, forming a substantially homogeneous mixture standardized as to relative proportions of respective ingredients.

ARVID M. ERICKSON.
HERBERT E. GRAY.